(No Model.)
G. S. ELLIOTT.
VEHICLE HUB.
No. 377,295. Patented Jan. 31, 1888.
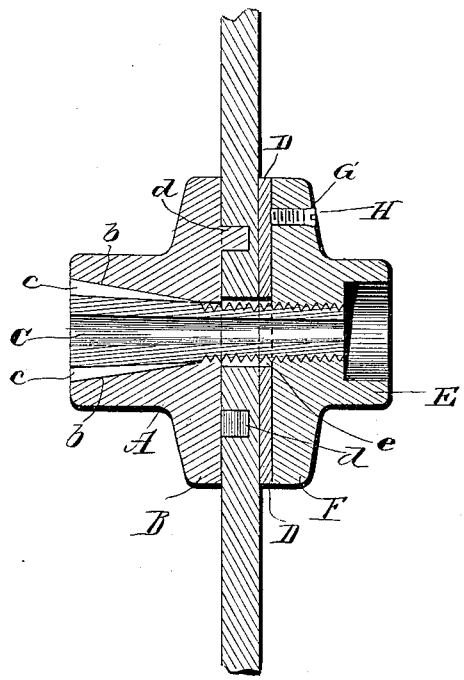
Witnesses
G. R. Nottingham
Albert Popkins
Inventor.
Geo. S. Elliott.
By his Attorney
H. A. Sugmam.

UNITED STATES PATENT OFFICE.

GEORGE S. ELLIOTT, OF MOBILE, ALABAMA.

VEHICLE-HUB.

SPECIFICATION forming part of Letters Patent No. 377,295, dated January 31, 1888.

Application filed September 29, 1887. Serial No. 251,065. (No model.)

*To all whom it may concern:*

Be it known that I, GEORGE S. ELLIOTT, of Mobile, in the county of Mobile and State of Alabama, have invented certain new and useful Improvements in Vehicle-Hubs; and I do hereby declare the following to be a full, clear, and exact description of the invention, such as will enable others skilled in the art to which it appertains to make and use the same.

My invention relates to hubs for carriages, wagons, and all kinds of vehicles.

The object of my present invention is to provide a hub which shall be simple and light in construction, and yet be capable of withstanding considerable weight brought to bear upon it.

A further object is to so construct the several parts of the hub that they can be easily and quickly assembled to retain the spokes in their proper position.

A further object is to provide means whereby the retaining-nut is separated from the spokes and prevented from rubbing them when being screwed upon the axle-box.

A further object is to provide means whereby the retaining-nut is prevented from unscrewing after the parts are all assembled.

With these ends in view my invention consists in certain features of construction and combinations and arrangements of parts, as hereinafter fully described, and particularly set forth in the claims.

In the accompanying drawing the figure is a sectional view of my device.

A indicates a collar having a flange, B, at one end, made at right angles thereto. The interior surface of this flanged collar is provided with grooves $b\,b$ at diametrically-opposite sides, for the reception of ribs $c\,c$, formed on an axle-box, C, which is adapted to fit in this collar A, thus locking the collar and axle-box together.

The inner face of the flange B is provided with a series of teeth or projections, $d$, which may be made integral with the flange or in the form of pins, sharpened at one end and passed through the flange near its periphery.

The spokes, which are provided with wedge-shaped tenons, are placed in position around the axle-box C, so that the edges of tenons of the spokes will rest against each other and all radiate from a common center, as shown, their inner faces resting against the face of the flange B, and the pins or teeth $d$ projecting into the tenons of the spokes. It will be seen that when the spokes are thus arranged and have the pins or teeth $d$ embedded in them they are prevented from turning on the axle-box, and thus obviate lost motion between the parts. A washer, D, made of sheet metal or other suitable material and provided at its center with a perforation, $e$, is placed upon the axle-box and made to rest upon the faces of the spoke-tenons opposite to the flange B, the perforation $e$ being of sufficient size to permit the washer to be moved over the screw-threaded portion of the axle-box.

A nut, E, provided with a flange, F, having a flat inner face, is now screwed upon the end of the axle-box and made to bear against the disk or washer D, as shown. This flanged nut is provided with the ordinary recess in its outer end for the reception of a nut, which is placed upon the axle extending through the axle-box, as usual.

The flange F is further provided with a screw-threaded perforation, G, between its periphery and the body of the nut E, for the reception of a set-screw, H, which, when the nut is brought up close against the washer, is drawn down against the latter to prevent the nut from unscrewing.

The side faces of the nut E may be flattened to accommodate a wrench by which the nut may be turned.

Having fully described my invention, what I claim as new, and desire to secure by Letters Patent, is—

1. In a hub, the combination, with an axle-box and a flanged collar, of a washer resting against the spokes, a flanged nut mounted on the screw-threaded end of the axle-box, and a screw mounted in the flange of the nut and bearing against the washer for locking the flanged nut against independent movement, substantially as set forth.

2. In a hub, the combination, with an axle-box having ribs thereon, of a flanged collar having grooves with which the ribs on the box register, a washer, a flanged nut mounted on the screw-threaded end of the box and provided at a point near the edge of the flange with a screw-threaded hole, and a screw-plug mounted in said hole and adapted to bear against the washer and lock the washer and nut against movement independently of the box, substantially as set forth.

In testimony whereof I have signed this specification in the presence of two subscribing witnesses.

GEO. S. ELLIOTT.

Witnesses:
  H. L. GRIFFING,
  W. F. HIGGINS.